(12) United States Patent
Kley

(10) Patent No.: US 7,947,952 B1
(45) Date of Patent: May 24, 2011

(54) NANOMACHINING METHOD AND APPARATUS

(75) Inventor: Victor B. Kley, Berkeley, CA (US)

(73) Assignee: General Nanotechnology LLC, Berkeley, CA (US)

( * ) Notice: Subject to any disclaimer, the term of this patent is extended or adjusted under 35 U.S.C. 154(b) by 0 days.

(21) Appl. No.: 11/728,744

(22) Filed: Mar. 26, 2007

Related U.S. Application Data

(63) Continuation of application No. 10/093,842, filed on Mar. 7, 2002, now Pat. No. 7,196,328.

(60) Provisional application No. 60/287,677, filed on Apr. 30, 2001, provisional application No. 60/274,501, filed on Mar. 8, 2001.

(51) Int. Cl.
*G01N 23/00* (2006.01)

(52) U.S. Cl. .................. 250/307; 250/306; 250/234

(58) Field of Classification Search .................. 250/307
See application file for complete search history.

(56) References Cited

U.S. PATENT DOCUMENTS

| | | | |
|---|---|---|---|
| 3,586,865 | A | 6/1971 | Baker et al. |
| 3,812,288 | A | 5/1974 | Walsh et al. |
| 4,115,806 | A | 9/1978 | Morton |
| 4,604,520 | A | 8/1986 | Pohl |
| 4,672,559 | A | 6/1987 | Jansson et al. |
| 4,673,477 | A | 6/1987 | Ramalingram et al. |
| RE32,457 | E | 7/1987 | Matey |
| 4,681,451 | A | 7/1987 | Guerra et al. |
| 4,697,594 | A | 10/1987 | Mayo, Jr. |
| 4,793,201 | A | 12/1988 | Kanai et al. |
| 4,831,614 | A | 5/1989 | Duerig |
| 4,866,986 | A | 9/1989 | Cichanski |
| 4,907,195 | A | 3/1990 | Kazan et al. |
| 4,924,091 | A | 5/1990 | Hansma et al. |
| 4,954,704 | A | 9/1990 | Elings et al. |
| 4,999,495 | A | 3/1991 | Miyata et al. |
| 5,001,344 | A | 3/1991 | Kato et al. |
| 5,010,249 | A | 4/1991 | Nishikawa |
| 5,015,850 | A | 5/1991 | Zdeblick |
| 5,018,865 | A | 5/1991 | Ferrell et al. |
| 5,025,346 | A | 6/1991 | Tang |
| 5,038,322 | A | 8/1991 | Van Loenen |
| 5,043,577 | A | 8/1991 | Pohi |
| 5,047,633 | A | 9/1991 | Finlan et al. |
| 5,047,649 | A | 9/1991 | Hodgson et al. |
| 5,072,116 | A | 12/1991 | Kawade et al. |
| 5,081,390 | A | 1/1992 | Elings et al. |

(Continued)

FOREIGN PATENT DOCUMENTS

EP 0 325 056 7/1989

(Continued)

OTHER PUBLICATIONS

Ager et al., "Multilayer hard carbon films with low wear rates," *Surface and Coatings Technology*, 91:91-94 (1997).

(Continued)

*Primary Examiner* — Phillip A Johnston
(74) *Attorney, Agent, or Firm* — Kilpatrick Townsend and Stockton LLP

(57) ABSTRACT

Methods and apparatus are disclosed for nanomachining operations. Excitation energy settings are provided to minimize machine induced scan cutting. Cut operations can be operated in a feedback mode to provide controlled cutting operations. Measurement and sweep techniques to facilitate nanomachining operations are disclosed.

9 Claims, 14 Drawing Sheets

U.S. PATENT DOCUMENTS

| | | | |
|---|---|---|---|
| 5,105,305 A | 4/1992 | Betzig et al. | |
| 5,107,112 A | 4/1992 | Yanagisawa et al. | |
| 5,108,865 A | 4/1992 | Zwaldo et al. | |
| 5,118,541 A | 6/1992 | Yamamoto et al. | |
| 5,138,159 A | 8/1992 | Takase et al. | |
| 5,142,145 A | 8/1992 | Yasutake | |
| 5,148,308 A | 9/1992 | Kopelman | |
| 5,155,589 A | 10/1992 | Gere | |
| 5,166,520 A | 11/1992 | Prater et al. | |
| 5,187,367 A | 2/1993 | Miyazaki | |
| RE34,214 E | 4/1993 | Carlsson et al. | |
| 5,204,531 A * | 4/1993 | Elings et al. | 250/306 |
| 5,210,410 A | 5/1993 | Barret | |
| 5,216,631 A | 6/1993 | Sliwa | |
| 5,220,555 A | 6/1993 | Yanagisawa | |
| 5,231,286 A | 7/1993 | Kajimura et al. | |
| 5,241,527 A | 8/1993 | Eguchi | |
| 5,249,077 A | 9/1993 | Laronga | |
| 5,252,835 A | 10/1993 | Lieber et al. | |
| 5,253,515 A | 10/1993 | Toda et al. | |
| 5,254,209 A | 10/1993 | Schmidt et al. | |
| 5,254,854 A | 10/1993 | Betzig | |
| 5,260,824 A | 11/1993 | Okada et al. | |
| 5,276,672 A | 1/1994 | Miyazaki | |
| 5,278,704 A | 1/1994 | Matsuda | |
| 5,283,437 A | 2/1994 | Greschner et al. | |
| 5,289,004 A * | 2/1994 | Okada et al. | 850/1 |
| 5,289,408 A | 2/1994 | Mimura | |
| 5,297,130 A | 3/1994 | Tagawa | |
| 5,299,184 A | 3/1994 | Yamano | |
| 5,302,239 A | 4/1994 | Roe et al. | |
| 5,307,311 A | 4/1994 | Sliwa | |
| 5,308,974 A | 5/1994 | Elings et al. | |
| 5,317,152 A | 5/1994 | Takamatsu | |
| 5,317,533 A | 5/1994 | Quate | |
| 5,319,961 A | 6/1994 | Matsuyama et al. | |
| 5,319,977 A | 6/1994 | Quate et al. | |
| 5,322,735 A | 6/1994 | Fridez et al. | |
| RE34,708 E | 8/1994 | Hansma et al. | |
| 5,338,932 A | 8/1994 | Theodore et al. | |
| 5,343,460 A | 8/1994 | Miyazaki | |
| 5,349,735 A | 9/1994 | Kawase | |
| 5,353,632 A | 10/1994 | Nakagawa | |
| 5,354,985 A | 10/1994 | Quate | |
| 5,357,109 A | 10/1994 | Kusumoto | |
| 5,357,110 A | 10/1994 | Statham | |
| 5,360,977 A | 11/1994 | Onuki et al. | |
| 5,362,963 A | 11/1994 | Kopelman et al. | |
| 5,373,494 A | 12/1994 | Kawagishi | |
| 5,389,475 A | 2/1995 | Yanagisawa | |
| 5,392,275 A | 2/1995 | Kawada et al. | |
| 5,393,647 A | 2/1995 | Neukermans et al. | |
| 5,396,483 A | 3/1995 | Matsida | |
| 5,408,094 A | 4/1995 | Kajimura | |
| 5,412,641 A | 5/1995 | Shinjo | |
| 5,414,260 A | 5/1995 | Takimoto et al. | |
| 5,414,690 A | 5/1995 | Shido et al. | |
| 5,416,331 A | 5/1995 | Ichikawa et al. | |
| 5,418,363 A * | 5/1995 | Elings et al. | 850/1 |
| 5,426,631 A | 6/1995 | Miyazaki et al. | |
| 5,453,970 A | 9/1995 | Rust et al. | |
| 5,455,420 A | 10/1995 | Ho et al. | |
| 5,461,605 A | 10/1995 | Takimoto | |
| 5,463,897 A | 11/1995 | Prater et al. | |
| 5,471,458 A | 11/1995 | Oguchi et al. | |
| 5,472,881 A | 12/1995 | Beebe et al. | |
| 5,490,132 A | 2/1996 | Yagi et al. | |
| 5,495,109 A | 2/1996 | Lindsay et al. | |
| 5,502,306 A | 3/1996 | Meisburger et al. | |
| 5,506,829 A | 4/1996 | Yagi | |
| 5,510,615 A | 4/1996 | Ho et al. | |
| 5,519,686 A | 5/1996 | Yanagisawa et al. | |
| 5,548,117 A | 8/1996 | Nakagawa | |
| 5,559,328 A | 9/1996 | Weiss et al. | |
| 5,560,244 A | 10/1996 | Prater et al. | |
| 5,583,286 A | 12/1996 | Matsuyama | |
| 5,602,820 A | 2/1997 | Wickramasinghe et al. | |
| 5,610,898 A | 3/1997 | Takimoto | |
| 5,623,476 A | 4/1997 | Eguchi | |
| 5,634,230 A | 6/1997 | Maurer | |
| 5,644,512 A | 7/1997 | Chernoff et al. | |
| 5,679,952 A | 10/1997 | Lutwyche et al. | |
| 5,717,680 A | 2/1998 | Yamano | |
| 5,721,721 A | 2/1998 | Yanagisawa | |
| 5,751,683 A | 5/1998 | Kley | |
| 5,756,997 A | 5/1998 | Kley | |
| 5,763,879 A | 6/1998 | Zimmer et al. | |
| 5,804,709 A | 9/1998 | Bourgoin et al. | |
| 5,821,410 A | 10/1998 | Xiang et al. | |
| 5,825,670 A | 10/1998 | Chernoff et al. | |
| 5,865,978 A | 2/1999 | Cohen | |
| 5,866,807 A * | 2/1999 | Elings et al. | 73/105 |
| 5,874,726 A | 2/1999 | Haydon | |
| 5,883,387 A | 3/1999 | Matsuyama et al. | |
| 5,922,214 A | 7/1999 | Liu et al. | |
| 6,031,756 A | 2/2000 | Gimzewski et al. | |
| 6,066,265 A | 5/2000 | Galvin et al. | |
| 6,101,164 A | 8/2000 | Kado et al. | |
| 6,144,028 A | 11/2000 | Kley | |
| 6,173,604 B1 | 1/2001 | Xiang et al. | |
| 6,199,269 B1 | 3/2001 | Greco et al. | |
| 6,201,226 B1 | 3/2001 | Shimada et al. | |
| 6,229,138 B1 | 5/2001 | Kley | |
| 6,229,607 B1 | 5/2001 | Shirai et al. | |
| 6,229,609 B1 | 5/2001 | Muramatsu et al. | |
| 6,232,597 B1 | 5/2001 | Kley | |
| 6,239,426 B1 | 5/2001 | Muramatsu et al. | |
| 6,242,734 B1 | 6/2001 | Kley | |
| 6,249,747 B1 | 6/2001 | Bennig et al. | |
| 6,252,226 B1 | 6/2001 | Kley | |
| 6,265,711 B1 | 7/2001 | Kley | |
| 6,281,491 B1 | 8/2001 | Kley | |
| 6,337,479 B1 * | 1/2002 | Kley | 250/234 |
| 6,339,217 B1 | 1/2002 | Kley | |
| 6,340,813 B1 | 1/2002 | Tominaga et al. | |
| 6,353,219 B1 * | 3/2002 | Kley | 250/234 |
| 6,369,379 B1 | 4/2002 | Kley | |
| 6,396,054 B1 | 5/2002 | Kley | |
| 6,507,553 B2 | 1/2003 | Kley | |
| 6,515,277 B1 | 2/2003 | Kley | |
| 6,517,249 B1 | 2/2003 | Doll | |
| 6,573,369 B2 | 6/2003 | Henderson et al. | |
| 6,614,227 B2 | 9/2003 | Ookubo | |
| 6,724,712 B2 | 4/2004 | Kley | |
| 6,737,331 B1 | 5/2004 | Lewis et al. | |
| 6,752,008 B1 | 6/2004 | Kley | |
| 6,787,768 B1 | 9/2004 | Kley et al. | |
| 6,802,646 B1 | 10/2004 | Kley | |
| 7,196,328 B1 | 3/2007 | Kley | |
| 2001/0010668 A1 | 8/2001 | Kley | |
| 2002/0007667 A1 | 1/2002 | Pohl et al. | |
| 2002/0117611 A1 | 8/2002 | Kley | |
| 2002/0135755 A1 | 9/2002 | Kley | |
| 2002/0189330 A1 | 12/2002 | Mancevski et al. | |
| 2003/0012657 A1 | 1/2003 | Marr et al. | |
| 2003/0027354 A1 | 2/2003 | Geli | |
| 2003/0062193 A1 | 4/2003 | Thaysen et al. | |
| 2003/0089182 A1 | 5/2003 | Thaysen et al. | |
| 2003/0167831 A1 | 9/2003 | Kley | |
| 2004/0118192 A1 | 6/2004 | Kley | |

FOREIGN PATENT DOCUMENTS

| | | |
|---|---|---|
| JP | 61-133065 | 6/1986 |
| JP | 01-262403 | 10/1989 |
| JP | 07-105580 | 4/1995 |
| WO | WO 96/03641 A1 | 2/1996 |
| WO | WO 97/04449 | 2/1997 |
| WO | WO 98/34092 A2 | 8/1998 |
| WO | WO 01/03157 | 1/2001 |
| WO | WO 03/046473 | 6/2003 |
| WO | WO 2004/023490 | 3/2004 |

OTHER PUBLICATIONS

Betzig et al "Near-Field Optics: Microscopy Spectroscopy and Surface Modification Beyond the Diffraction Limit" Science 257:(1992).

Dai et al. "Nanotubes as nanoprobes in scanning probe microscopy," Nature 384:147-150 (1996).

Davis "Deposition characterization and device development in diamond silicon carbide and gallium nitride thin films" J. Vac. Sci. Technol. A 11(4). Jul./Aug. (1993).

Diaz, D.C., et al., An Improved Fabrication Technique for Porous Silicon, Rev. Sci. Instrum.64 (2), Feb. 1993, pp. 507-509.

Givargizov et al "Growth of diamond particles on sharpened silicon tips" Materials Letters 18:(1993).

Gomyou, H., et al. Effect of Electrochemical Treatments on the Photoluminescence from Porous Silicon, J. Electrochem. Soc., vol. 139, No. 9, Sep. 1992, pp. L86-L88.

Jaschke et al. "Deposition of Organic Material by the Tip of a Scanning Force Microscope," Langmuir 11:1061-1064 (1995).

Nossarzewska-Orlowska, E., et al., Photoluminescence Properties of Porous Silicon Prepared by Electrochemical Etching of Si Epitaxial Layer, Acta Physica Polonica A, No. 4. vol. 84 (1993), pp. 713-716.

Rasmussen et al. "Fabrication of an All-metal Atomic Force Microscope Probe," IEEE (1997).

Rossow, U., et al., Influence of the Formation Conditions on the Microstructure of Porous Silicon Layers Studied by Spectroscopic Ellipsometry, Thin Solid Films, 255 (1995), pp. 5-8.

Smestad, G., et al., Photovoltaic Response in Electrochemically Prepared Photoluminescent Porous Silicon, Solar Energy Materials and Solar Cells, 26, pp. 277-283 (1992).

Tang, William Chi-Keung, "Electrostatic comb drive for resonant sensor and actuator applications," Abstract of dissertation at the University of California at Berkeley (1990).

Toledo-Crow et al "Near-field differential scanning optical microscope with atomic force regulation" Appl. Phys. Lett. 60: (1992).

Van Hulst et al "Near-field optical microscope using a silicon-nitride probe" Appl. Phys. Lett. 62: (1993).

Watson et al "The Radiation Patterns of Dielectric Rods—Experiment Theory" Journal of Applied Physics 19: (1948).

* cited by examiner

NANOMACHINING METHOD AND APPARATUS

CROSS-REFERENCES TO RELATED APPLICATIONS

The present application is a Continuation Application of U.S. application Ser. No. 10/093,842, filed Mar. 7, 2002, which claims priority from U.S. Application No. 60/274,501, filed Mar. 8, 2001, and U.S. Application No. 60/287,677, filed Apr. 30, 2001, all of which are incorporated by reference in their entirety for all purposes:

The following are incorporated by reference in its entirety for all purposes:

U.S. Pat. No. 6,752,008, issued Jun. 22, 2004;
    U.S. Pat. No. 7,196,328, issued Mar. 27, 2007;
    U.S. Pat. No. 6,923,044, issued Aug. 2, 2005;
    U.S. patent application Ser. No. 10/094,411, filed Mar. 7, 2002;
    U.S. Pat. No. 6,802,646, filed Oct. 12, 2004; and
    U.S. Pat. No. 6,787,768, issued Sep. 7, 2004.

The following U.S. patents are incorporated by reference in their entirety for all purposes:

U.S. Pat. No. 6,144,028, issued Nov. 7, 2000;
    U.S. Pat. No. 6,252,226, issued Jun. 26, 2001;
    U.S. Pat. No. 6,337,479, issued Jan. 8, 2002; and
    U.S. Pat. No. 6,339,217, issued Jan. 15, 2002.

The disclosure of the following published PCT application is incorporated by reference in its entirety for all purposes:

WO 01/03157 (International Publication Date: Jan. 11, 2001 based on PCT Application No. PCT/US00/18041, filed Jun. 30, 2000 by Victor B. Kley for "Object Inspection and/or Modification System and Method."

BACKGROUND OF THE INVENTION

This invention is related generally to the field of Atomic Force Microscopy (AFM), Scanning Tunneling Microscopy (STM), Near field Scanning Optical Microscopy (NSOM), NanoSpectroPhotometry (NSP), NanoPolarimetry (NP), Magnetic Field Microscopy (MFM) and any other methods adaptable and suitable to guide the nanomachining techniques described herein. Specifically, the invention is directed to nanomachining techniques and apparatus, using AFM, NSOM, NSP, NP, MFM and STM technologies. These technologies are sometimes collectively referred to as Scanning probe Microscopy (SPM). Generally, SPM technologies allow one to "see" atomic-scale features on or in surfaces.

An AFM works by scanning a tip over a surface much the same way as a phonograph needle scans a record. The tip is located at the end of a cantilever beam and positioned over the surface to be scanned. The combination of the cantilever beam and tip is sometimes referred to collectively as a scanning probe or simply a probe.

AFM techniques rely on the effects of the inter-atomic interactions, such as van der Waals forces, that arise between the atoms in the structure of the tip and the atoms at the surface being imaged. As the tip is repelled by or attracted to the surface, the cantilever beam is deflected. The magnitudes of the deflections correspond to the topological features of the atomic structure of the surface being scanned. The AFM can work with the tip touching the sample (contact mode), or the tip can tap across the surface (tapping mode), or made to not touch the surface at all (non-contact mode—the preferred embodiment).

STM techniques rely on the fact that the electronprobability cloud associated with the atoms at the surface extends a very small distance above the surface as described by the quantum physical model. When a tip is brought sufficiently close to such a surface, there is an increasingly stronger probability of an interaction (current) between the electron cloud on the surface and that of the tip atom. An electric tunneling current flows when a small voltage is applied. The tunneling current is very sensitive to the distance between the tip and the surface. These changes in the tunneling current with distance as the tip is scanned over the surface are used to produce an image of the surface.

AFM is being used to solve processing and materials problems in a wide range of technologies affecting the electronics, telecommunications, biological, chemical, automotive, aerospace, and energy industries. The materials being investigated include thin and thick film coatings, ceramics, composites, glasses, synthetic and biological membranes, metals, polymers, and semiconductors. The AFM is being applied to studies of phenomena such as abrasion, adhesion, cleaning, corrosion, etching, friction, lubrication, plating, and polishing.

The STM is widely used in both industrial and fundamental research to obtain atomic-scale images of surfaces. It provides a three-dimensional profile of the surface which is very useful for characterizing surface roughness, observing surface defects, and determining the size and conformation of molecules and aggregates on the surface.

A common image scanning technique involves vibrating a probe along the Z-axis as it is being translated in the X-Y plane about a surface of interest (STM is another common scanning technique, but is only suitable for conductive surfaces). The vibration is usually sinusoidal and maintained at a particular frequency. Typically, this frequency is the resonant frequency of the cantilever portion of the probe. An excitation energy is applied to the probe to create the vibratory motion, where the peak-to-peak deflection of the tip is determined by the level of the excitation energy. There are three common modes of operation: (1) the probe can work with the tip touching the surface (contact mode), (2) non-contact mode where the tip vibrates near the surface, and (3) the tip can tap across the surface (tapping mode). As the tip is scanned across the surface, the peak-to-peak deflection varies due to attractive forces between the constituent atoms of the tip and the atomic particles of the surface being scanned. An image of the surface is produced from variations in the resonance required to maintain a constant peak-to-peak deflection (e.g., using a feedback loop) by applying known image processing methods as is well known in the art.

Nanomachining involves removing material from a surface in a controlled manner to attain specific surface features. Typically, an appropriate scanning probe is manipulated so that its tip comes into contact with a surface to be nanomachined. The scanning probe is then translated along a pre-programmed vector, producing a scraping action across the contacted surface and removing an amount of material from the surface. An appropriate feed is applied to control the amount of material removed. This is repeated until the desired features are achieved. Any surface which is exposed to contact by the scanning probe can be nanomachined. Thus, for example the walls of a vertical structure can be nanomachined using a scanning probe having an appropriately shaped tip applied to the wall with an appropriate feed force. General techniques are more fully discussed in the various above-identified commonly owned U.S. patents and co-pending U.S. patent applications.

A commonly performed operation is the positioning of the scanning probe to locate the probe prior to making a cut. The process of locating involves scanning the surface to determine the position, for example by any of the techniques available to SPM and well known in the art. A side-effect of these scan methods is the physical alteration of the surface being scanned due to the contacting action of the probe tip upon the surface. This effect is sometimes referred to as "scan cutting." Scan cutting can be disastrous for nanomachining purposes. Nanomachining techniques often involve making repeated motions along the same path. Consequently, the cumulative effect of scan cutting that would result during a nanomachining operation must be predictable and controlled.

When performing a nanomachining operation, it may be desirable to be able to verify or monitor the location of the surface as it is being machined. For example, if a recess is being formed into the surface of a workpiece, it might be desirable to confirm the depth of the recess. It might be necessary to monitor the progress of the nanomachining operation to detect when to stop the process. For example, nanomachining a workpiece comprising a multi-layered structure of different materials will likely progress at different rates due to varying hardness from one layer to the next. The ability to monitor the progression of the nanomachining operation allows appropriate control of the feedforce of the tip upon the surface to be nanomachined.

There is a need for techniques to improve nanomachining practices.

BRIEF SUMMARY OF THE INVENTION

In accordance with the invention nanomachining methods and apparatus include components for determining certain operating parameters for nanomachining. In one aspect of embodiments of the invention one such parameter, namely excitation energy setting, is determined with an iterative process. In another aspect of embodiments of the invention, one or more cutting parameters are adjusted in a feedback loop such as amount of feed, number of cutting passes before a measure is made, number of strokes comprising a pass, angle of the pass, tool tip used in a single or multiple pass (e.g., roughing step and fine cutting step). In still another aspect of the embodiments of the invention, various sweep techniques are provided to facilitate the nanomachining operation. In still yet another aspect of embodiments of the invention, sweep techniques are provided to perform specialized cut operations.

A further understanding of the nature and advantages of the present invention may be realized by reference to the remaining portions of the specification and the drawings.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
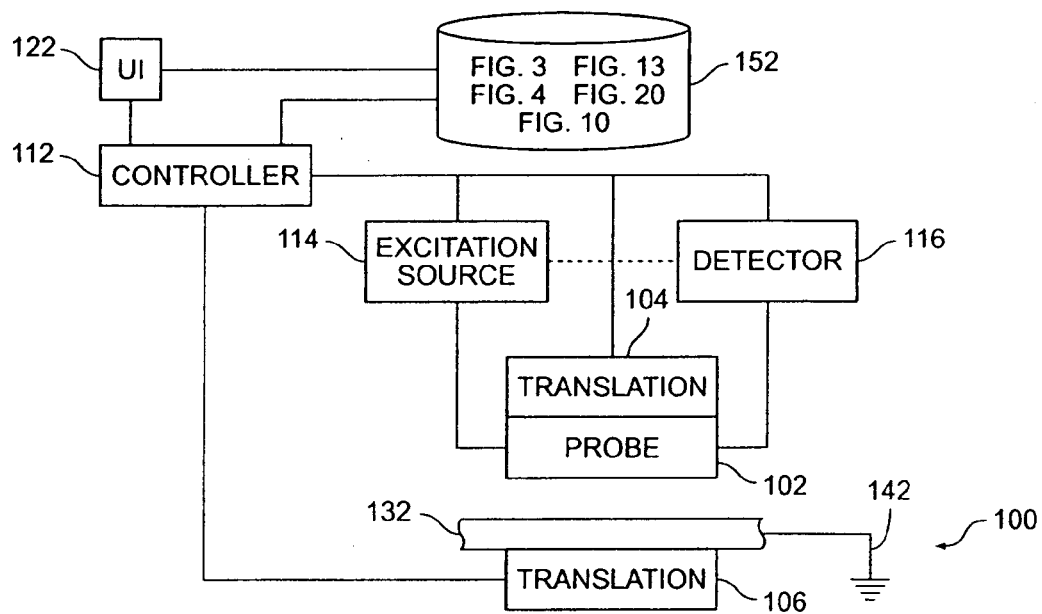
FIG. 1 is a high level block diagram illustrating a nanomachining system in accordance with an embodiment of the invention.

FIG. 1 shows an illustrative embodiment of the present invention by way of a generalized block diagram, illustrating a scanning probe microscopy system 100 that is adapted for nanomachining. A scanning probe 102 is the workhorse of the nanomachining system. A typical probe comprises a cantilever and a tip disposed at the free end of the cantilever. Various tip shapes and configurations suitable for nanomachining are disclosed in the various above-identified commonly owned issued patents and commonly owned, co-pending patent applications.

Figure 2:
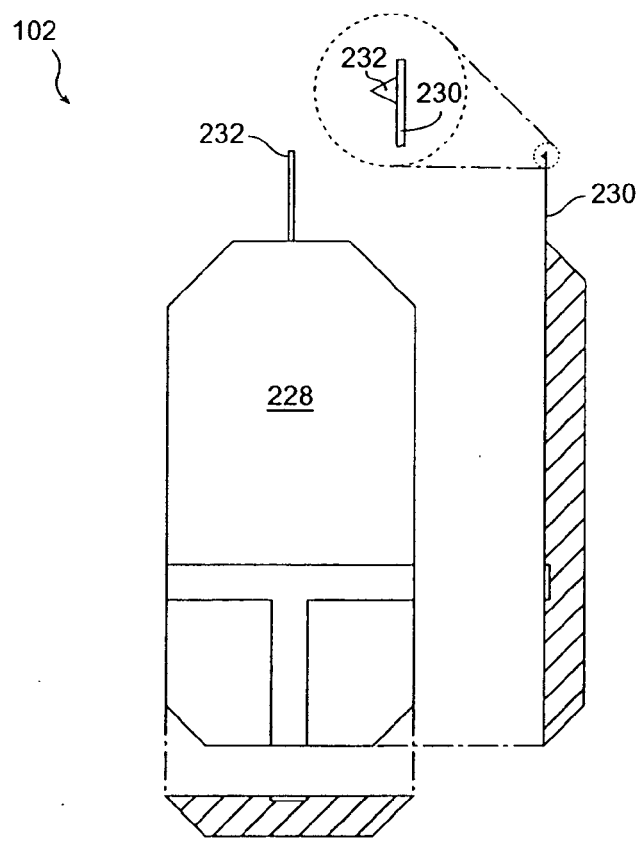
FIG. 2 is a schematic illustration of a typical scanning probe suitable for use with the nanomachining methods and apparatus of the invention.

FIG. 2 shows a typical scanning probe 102 suitable for use with the present invention. A cantilever 230 is attached to a body member 228 which provides structure for attachment to a probe translation apparatus. Disposed at the free end of the cantilever is an appropriately shaped probe tip 232. An enlarged portion of the free end is shown in the side view. The particular dimensions of the probe will vary depending on the particular application.

The probe 102 can be coupled to a first translation stage 104. The first translation stage can provide movement of the probe in the X-Y plane. By convention, the X-Y plane is the plane parallel to the major surface of a workpiece 132. Thus, the probe can be positioned in the X-Y position relative to the workpiece by the first translation stage. The first translation stage can also provide movement of the probe in the Z-direction and thus position the probe in three-dimensional space relative to the workpiece. Such first translation stages are known and well understood devices. Typically, they are piezoelectric devices.

Alternatively, a second translation stage 106 can be provided. The workpiece 132 can be affixed to the second translation stage to provide X-Y motion of the workpiece relative to the probe 102. Furthermore, the second translation stage can provide motion of the workpiece in the Z direction relative to the probe. Such stages are typically linear motors, or precision ball screw stages or combinations thereof with linear scale or interferometric position feedback.

The relative motion between the probe 102 and the workpiece 132 can be achieved by any of a number of techniques. The probe can be translated in three dimensions while maintaining the workpiece in a stationary position. Conversely, the workpiece can move relative to a stationary probe. Both the probe and the workpiece can be moved in a coordinated fashion to achieve rapid positioning. The first translation stage 104 might provide only X-Y motion, while Z-axis positioning is provided by the second translation stage 196; or vice-versa. These and still other combinations of concerted motions of the probe and the workpiece can be performed to effect relative motion between the probe and the workpiece.

In the principle embodiment using non-contact AFM an excitation source 114 delivers an excitation energy to the probe 102 to make the probe vibrate in a resonant fashion. The excitation energy can be any form of energy suitable to resonate the probe. For example, a typical scanning probe used in atomic force microscopy comprises a cantilever formed of silicon. A piezoelectric bimorph or tube attached to the translation means has the probe mounted on it and the piezoelectric element is then electrically driven at a wavelength at which the cantilever resonates. However, alternative probe architectures might use a bi-metal construction that is driven by thermal energy. Surface acoustic waves (SAW), linear or rotational MEMS structures and piezoresistors can also be used to provide excitation energy for resonating the probe.

A detection module 116 is coupled to detect atomic interactions between the atoms which constitute the probe tip and the constituent atoms of the surface being scanned. Many detection techniques are known. For example, if the probe is operated in AFM (atomic force microscopy) mode, the cantilever resonance point is shifted by the interatomic forces acting between the tip and the surface as the tip is scanned across the surface. The resonance change can be measured or the gross deflections can be measured optically. A series of raster scans is then conventionally used to form a surface map of the area scanned and may be capable of producing data representative of the atomic scale topography of the surface.

A generalized controller 112 can be configured to provide various computer-based functions such as controlling the components of the nanomachining system, performing data collection and subsequent analysis, and so on. Typically, the controller is some computer-based device; for example, common architectures are based on a microcontroller, or a general purpose CPU, or even a custom ASIC-based controller.

Appropriate control software is provided to operate the computing components to perform the foregoing functions. For example, control signals coordinate the components of the nanomachining system to effect nanomachining operations disclosed herein. It is understood that the generalized controller functions can be allocated to other system components to meet particular system requirements and constraints for a given implementation. For example, data analysis functionality can easily be off-loaded to another computer. The nanomachining system 100 can have a network connection to a larger system. It is well within the capability of persons of ordinary skill in the relevant arts to produce the appropriate programming code needed to perform the control sequencing and delivery of control signals to coordinate the various components of the nanomachining system 100 to effect the processing discussed below.

A user interface 122 is provided to allow a user to interact with the system. The "user" can be a machine user. A machine interface might be appropriate in an automated environment where control decisions are provided by a machine.

A data store 152 contains various information to facilitate nanomachining operations and for overall operation of the nanomachining system. The data store contains the programming code that executes on the controller 112, described in the flow charts of FIGS. 3, 4, 10, 13, and 20. The data store can include a library of one or more excitation energy preset levels. A preset level is selected from the library via the user interface 122. The preset is fed to the controller 112, which uses the information to control the excitation energy level that is delivered to the scanning probe 102. Other kinds of information include cutting parameters for setting up the nanomachining system to perform a nanomachining operation. These pieces of information will be discussed below. The data store shown in the figure can be any appropriate data storage technology, ranging from a single disk drive unit to a distributed data storage system.

Figure 3:
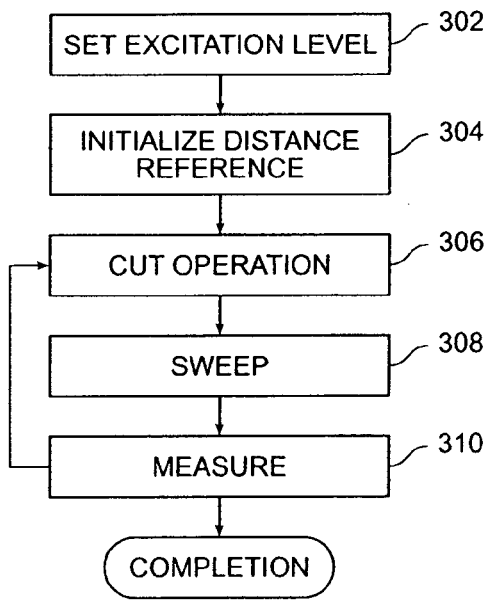
FIG. 3 is a flowchart showing the general steps for nanomachining operations in accordance with an embodiment of the invention.

Referring now to FIG. 3, a high level flowchart shows the major processing steps for a nanomachining operation according to an embodiment of the present invention. Nanomachining involves the basic steps of: positioning the probe 102 to a location on the workpiece 132; applying the tip of the probe to the surface to be cut with an appropriate feed force; and translating the probe along a translation vector. The foregoing sequence of actions is referred to as a "cut pass."

A commonly performed operation is the positioning of the probe at the beginning of a cut pass. This is accomplished by scanning the probe across the surface of the workpiece. A probe is scanned across the surface by applying an excitation energy to the probe to set up a vibratory motion. As the probe tip is translated across the surface, the position of the probe tip can be gauged by the observable effect on the vibratory motion of the probe as the tip is moved across the surface. However, as noted above, a side-effect of the scanning is the physical alteration of the surface being scanned due to the contacting action of the probe tip upon the surface, an effect called "scan cutting."

A calibration procedure in accordance with the invention is performed in a step 302, to determine an excitation energy level that is appropriate for nanomachining. An appropriate excitation level is one where there is no appreciable scan cutting artifact that results from the scanning that occurs during a nanomachining operation. Once an appropriate excitation energy level is determined, the scanning probe can be quickly set when performing subsequent nanomachining operations without having to repeat the calibration procedure. Or the tip calibration can be used to estimate a proper setting for the excitation for every operation when the measurement is sufficiently fast.

Next, a reference location is established in a step 304. As the name implies, the location establishes a reference for gauging the progress of the nanomachining operation. If a recess is being formed into the surface of a workpiece, for example, it might be desirable to determine the depth of the recess (a Z-direction metric) in order to ascertain the stop point for the nanomachining operation. This can be accomplished by making a Z-axis measurement in the nanomachined area relative to the reference location.

The reference location can be a Z-axis location, or a location in the X-Y plane. In the foregoing example of a nanomachined recess, a Z-axis reference location is appropriate. On the other hand, an unwanted feature protruding in the X-Y direction from a structure would call for an X-Y reference location. If the protrusion is to be shaved off by a lateral nanomachining operation, it might be desirable to know when a sufficient portion of the protrusion has been removed. This can be accomplished by making X- and/or Y-axis distance measurements of the nanomachined surface relative to an appropriately established reference location in the X-Y plane. The measurement(s) provide information as to the lateral distance traversed by the cut operation.

The term "distance" has a dual meaning, depending on its usage. On the one hand, "distance" refers to vertical distance when a recess is being nanomachined into existence, or when an unwanted lump of material is to be shaved down toward the surface of the workpiece. On the other hand, "distance" refers to a lateral metric (X-Y plane) when nanomachining involves cutting (trimming) a surface in a direction parallel to the X-Y plane. Distance is generalized by $$d=\sqrt{x^2+y^2+z^2},$$

although pieced out, these measures can be used together to make any arbitrary shape in three-dimensional space.

In a step 306, the cut operation is performed. As defined above, one or more "cutting passes" might be performed during this step. After making the one or more cutting sequences, a sweep operation is performed in a step 308. The sweep operation in the context of a cut operation serves to remove the debris from the around the cut that is produced by the cut operation. As will be explained, sweeping is itself a form of cut operation. Thus, while the sweep operation used in conjunction with a cut operation is performed for the purpose of removal of debris, additional uses of the sweep operation will be discussed.

A measurement is made in a step 310 after the sweep operation is completed. A distance measurement of the cut area is made relative to the reference location determined in step 304. The distance measurement provides an indication of the progress of the cut operation. A stop condition for the cut operation, for example, can arise once the desired distance (i.e., depth or lateral distance) is reached. The stop condition can also simply be the completion of a predetermined number of cut operations.

Figure 4:
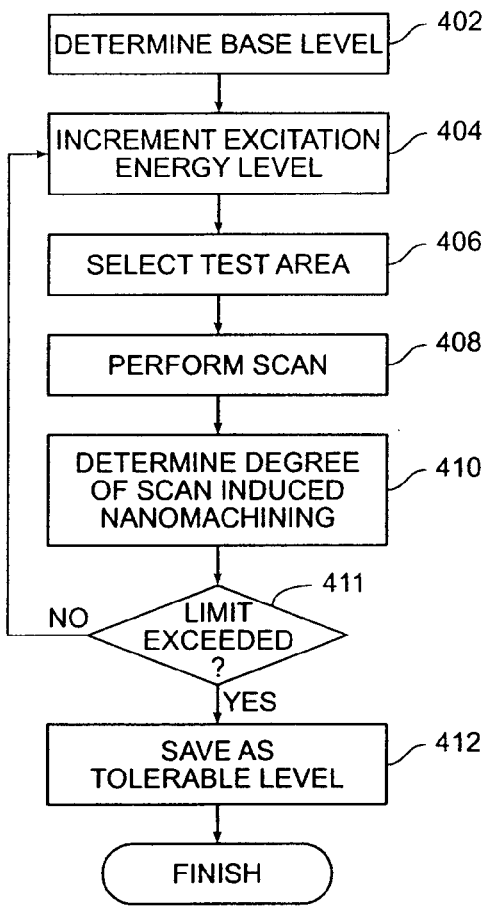
FIG. 4 is a flowchart showing the general steps for determining the excitation energy in accordance with an embodiment of the invention.

FIG. 4 is a high level flowchart showing a calibration procedure according to an embodiment of the present invention. The procedure determines a tolerable level of excitation energy that is suitable for driving the scanning probe (102, FIG. 1) during the scanning phases of a nanomachining operation.

In a step 402, a threshold level for the excitation energy is determined. The threshold level is a sufficiently low level of excitation energy that the peak-to-peak deflections of the tip are not significantly detectable by the detection module 106. By staying below the detection threshold of the detection module the surface being scanned is not detectable. This threshold level establishes a starting point for determining a tolerable level of excitation energy for nanomachining purposes.

In one embodiment of the invention, the threshold level is determined by setting the excitation energy to a level which can be detected by the detection module. The scanning probe scans the surface (the servo system of the primary embodiment maintains this distance as is well known in the art). As the probe is scanned across the surface, the excitation energy level is incrementally decreased until the detection module no longer detects the surface. The excitation energy level at that point is recorded as the threshold level.

In another embodiment of the invention, the threshold level is determined by setting the excitation lower after having first found the surface and continuing to lower the excitation until the signal is lost and then raising it a fixed amount above the threshold. In non-contact mode (the preferred embodiment) no scanning can take place without a signal for the servo system to move the tip up and down (the z direction) while it is moved across the surface in x and y (the scan). In contact mode (no excitation is used in this mode) the tip is dragged over the surface and the limp cantilever lets the tip fall or rise with the surface.

When the threshold level is determined, the process for determining the tolerable excitation energy level can proceed. The process is an iterative one. In step 404, an excitation energy level is selected by incrementing the currently set excitation energy level by a certain amount. The increment value can be a fixed value. The increment value can vary from one iteration to the next. In an embodiment of the invention, the increment value is a fixed value. For the first iteration, the current excitation energy level is set to the threshold level determined in step 402.

Next, in step a 406, a test surface on the surface of a workpiece is selected. The workpiece can be a block of scrap material that has the same material composition as the actual workpiece to be nanomachined. Alternatively, the workpiece can be the actual workpiece itself. Nanomachining typically involves areas on the order of square nanometers of surface area. A macro-scale workpiece typically has vast regions of available area. This calibration procedure requires only a fraction of area to perform, and thus can be performed on the actual workpiece in an area where detrimental effects are not important.

The scanning probe is positioned at the selected test surface and a scanning sequence is performed at a step 408 on the test surface while driving the scanning probe at the selected excitation energy level. The scanning sequence involves making a certain number of passes on the test surface along a single scan vector. A scan vector specifies the direction and distance of the scan. A vector is chosen such that a clear image of a transition is obtained (e.g., a rise or fall in the local topography) commonly this transition structure is visible as an edge, optically. If instead, a trench (rather than a degraded edge) is to be the scan cut test result the vector can be anywhere that such a scan trench would be easily discerned among the surrounding structure (like a plane or flat, smooth area).

The number of scan passes (N) is based on the number of expected scans for a particular nanomachining operation. The goal of this calibration procedure is to determine a tolerable level of excitation energy such that when the scanning probe is scanned at the energy level during a nanomachining operation, the consequent scan induced nanomachining is within a tolerable limit as determined by the requirements of the workpiece being nanomachined. The number of expected scans (M) during a nanomachining operation typically is a priori knowledge, perhaps determined by a user (human user or an automated design process) having knowledge of the nanomachining operation to be performed.

The number of scan passes N can be set to the expected number of scans M. The tolerable level determined in this manner, in principle, should ensure that scan induced nanomachining will be at acceptable levels. However, as with any engineering design limit, a margin is usually factored in to provide a buffer zone for variations in the process. Here, the value of N is determined by S×M, where S is a scaling factor which provides a margin for error. Typically, the scaling factor is set to 2, but can be set to other values. The particular value will depend on factors not relevant to the practice of the invention.

After the specified number of scan passes has been performed, a determination of the degree of scan induced nanomachining is made in a step 410. This determination can be made by making a measurement of the depth of the trench formed in the test surface that results from scan induced nanomachining. One measurement technique is discussed below. If the measured depth does not exceed a tolerance limit set by the user, then the procedure is repeated (step 411).

If the measured depth does exceed the tolerance limit, then the process completes. The tolerance level can be set to the current excitation energy level setting, which produces scan induced nanomachining that just exceeds the user-specified tolerance. Alternatively, the tolerance level can be set to the previous setting. A factor to consider is that a higher excitation energy increases the sensitivity of the scan. Since the scan pass N already factors in a margin for error, it may be desirable to select the higher excitation energy setting as the tolerable level to obtain the benefit of the increased sensitivity.

The tolerable level of excitation energy determined by the foregoing procedure is dependent on various factors including the material of the surface, the constituent material of the scanning tip, the mechanical properties of the cantilever, the number of expected scans, and so on. Thus, it might be desirable to create a library of tolerable excitation energy levels for various combinations of materials expected to be encountered by the particular nanomachining system. An appropriate tolerable level setting can then be selected based on the specific materials and conditions involved in a particular nanomachining operation.

Figure 5:
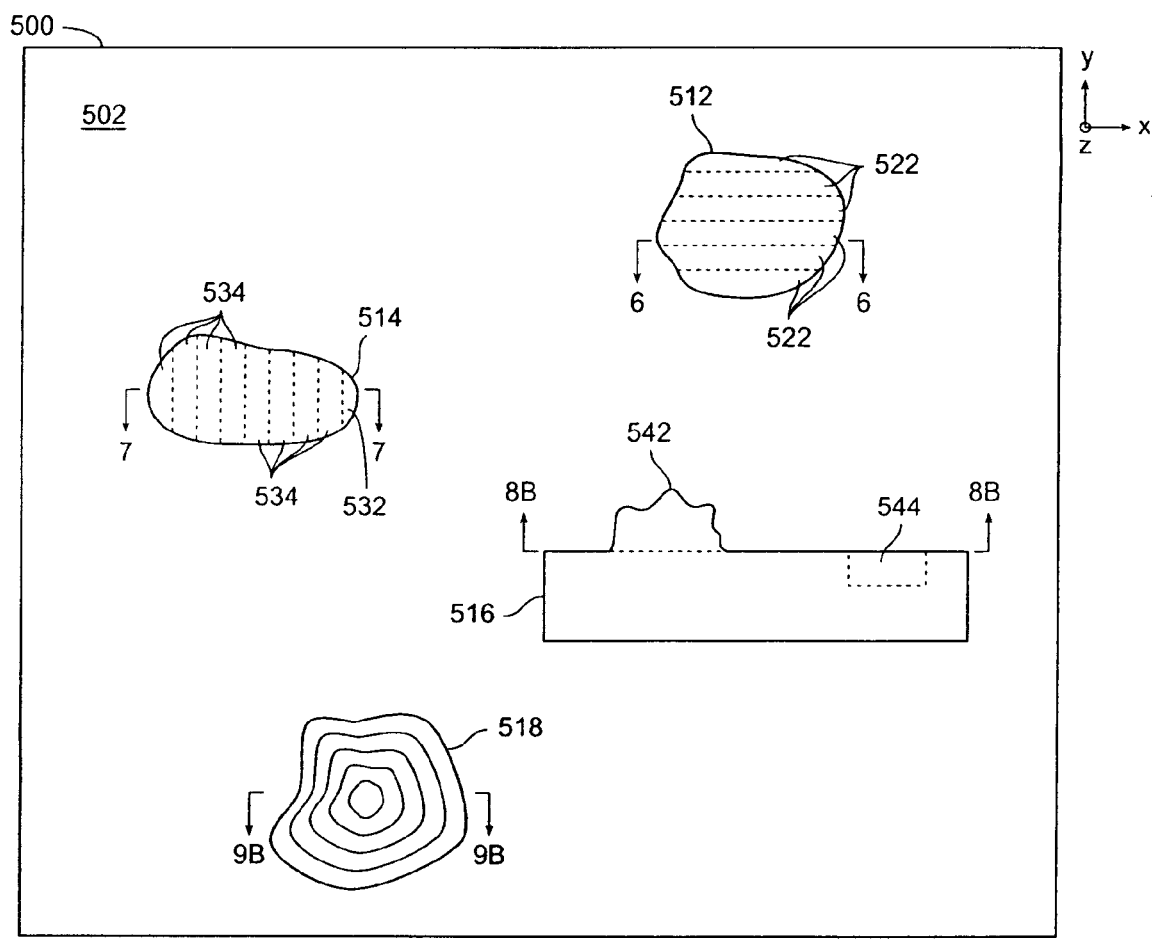
FIG. 5 is a gross scale top view representation of a surface of a workpiece having various structures subject to nanomachining.

FIGS. 5-9 are diagrammatic drawings illustrating highly exaggerated features of micron- and submicron-scaled elements to facilitate the discussion various cut operations that can be performed for nanomachining in accordance with embodiments of the present invention. FIG. 5 shows a highly simplified top view representation of a surface 502 of a workpiece 500 to be nanomachined. X- and Y-direction coordinates are referenced as shown. The Z-direction coordinate is perpendicular to the drawing sheet. A first region 512 shows a recess cutting operation. A second region 514 illustrates a recess cutting operation using a trim technique. A third region 516 shows a trim operation. A fourth region 518 illustrates another trim operation. These cut and trim operations will be discussed in more detail below.

Before proceeding, a few words about terminology would be appropriate at this point. The terms such as "cut," "trim," and their various grammatical forms all relate to the general notion of nanomachining. The only distinction among the terms used in this application is the direction of the nanomachining operation. For example, a "cut" is typically used when referring nanomachining along the Z-axis. Similarly, a "trim" is a nanomachining operation that proceeds laterally along the surface of the workpiece in the X-Y plane. Though an attempt is made to use these terms consistently, other terminology may slip in. For example, a trim might be referred to as a lateral cut. To the extent that "cut" and "trim" differ only with respect to the direction of the operation, it is understood that these terms and others might be used interchangeably and in combination to refer to nanomachining operations in general. The orientation of the nanomachining operation can be obtained from the context of the discussion. Finally, the XYZ axis convention adopted in this application is for the major surface of the workpiece to lie along the X-Y plane, where the Z-axis lies perpendicular to the major surface. Further it is understood that these methods may be combined to obtain any arbitrary surface in three space.

Continuing then, a cut operation includes providing a downfeed by appropriate movement of the translation stage (104, FIG. 1) in the Z-direction. In the case of a lateral cut along a direction in the X-Y plane, the lateral feed is applied by appropriate movement of the translation stage in the X-Y direction(s). The controller 112 provides the appropriate control signals to coordinate these activities. It is understood that the scanning probe 102 will be properly configured to perform scanning operations and cutting operations as needed.

Figure 6A:
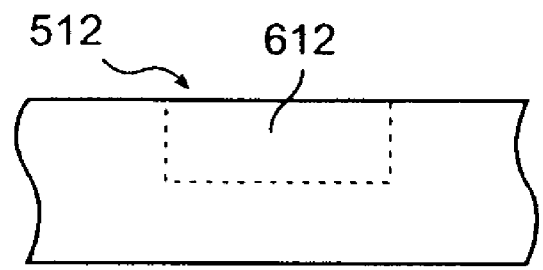
FIGS. 6A-6C are side views of a portion of the workpiece of FIG. 5, showing a recess forming sequence in accordance with an embodiment of the invention.
Figure 6B:
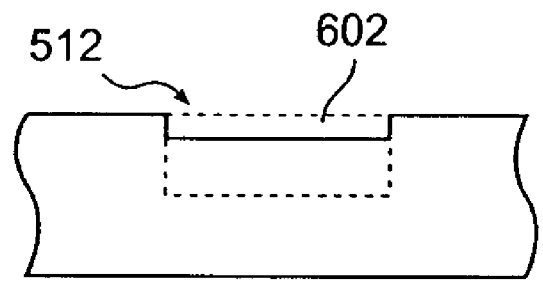
Figure 6C:
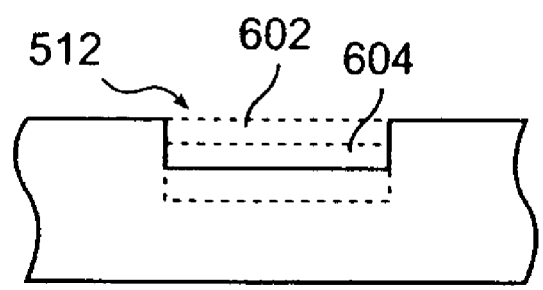

FIGS. 6A-6C is a sequence of cross-sectional views of region 512 taken along view lines 6-6 of FIG. 5. In one embodiment of the invention, recess cutting involves taking multiple cut passes across the exposed surface of the region to be nanomachined, in this case region 512. FIG. 5 shows in region 512 multiple cut passes 522 made in the region. Each cut pass is made by performing a scan operation to properly position the scanning probe in the region 512. A downfeed is applied to press the tip of the scanning probe against the surface. The scanning probe is then translated along an appropriate scan vector to effect a cut operation.

The cutting sequence is shown in FIGS. 6A-6C. FIG. 6A shows in phantom the volume of material 612 to be removed from region 512. The cutting proceeds one layer at a time. In the particular embodiment shown, all the cut passes 522 are performed to remove a layer of material from the region 512 before performing cut passes to remove the next layer. Thus, FIG. 6B illustrates that a first layer of material 602 has been removed. FIG. 6C shows a second layer of material 604 having been removed. This sequence is repeated until the desired recess has been formed.

FIGS. 7A-7D is a sequence of cross-sectional views of region 514 taken along view lines 7-7 of FIG. 5. In one embodiment of the invention, recess cutting using a trim (lateral cut) technique involves producing an initial recess 532 at a beginning area of region 514. This is followed by making multiple trim cut passes in the exposed surface of the hole of the region to be nanomachined, in this case region 514. FIG. 5 shows multiple trim cut passes 534 made in region 514. Each trim cut pass is performed by applying an appropriate feed force to press the tip against the surface to be trimmed.

Figure 7A:
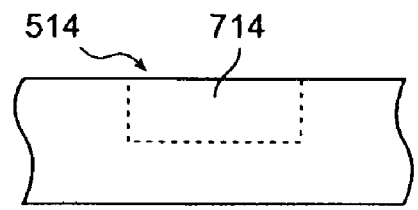
FIGS. 7A-7D are side views of a portion of the workpiece of FIG. 5, showing a recess forming sequence in accordance with another embodiment of the invention.
Figure 7B:
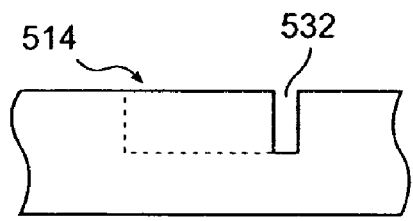
Figure 7C:
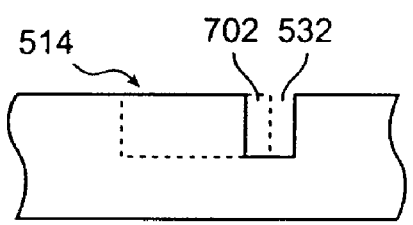
Figure 7D:
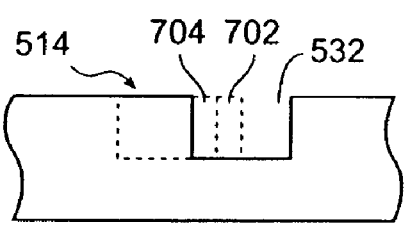

The cutting sequence is shown in FIGS. 7A-7D. FIG. 7A shows in phantom the volume of material 714 to be removed from region 514. The trim cut first creates the recess 532 formed into the region, FIG. 7B. The recess can be created by cutting down and then to the side. Subsequent trim cut passes proceed one layer at a time. Thus, FIG. 7C illustrates that a first layer of material 702 has been removed. FIG. 7D shows a second layer of material 704 having been removed. This procedure is repeated until the recess has been formed.

A structure which constitutes region 516 is shown in FIG. 5 to illustrate how a trim (lateral) cut can be performed on surface structures. Here, as in the case of nanomachining the region 514, the tip is pressed against a portion of the structure with an appropriate feed force to produce a cutting action of the structure. As the figure shows, a positive surface feature such as the protruding portion 542 formed on the structure 516 represents an unwanted feature to be removed by nanomachining (examples of a negative surface feature include a detent or recess formed into the surface). By applying an appropriate scan vector and an appropriate feed, the scanning probe can remove the unwanted feature 542. A lateral recess 542 can be formed into the structure 516 in very much the same manner.

Figure 8A:
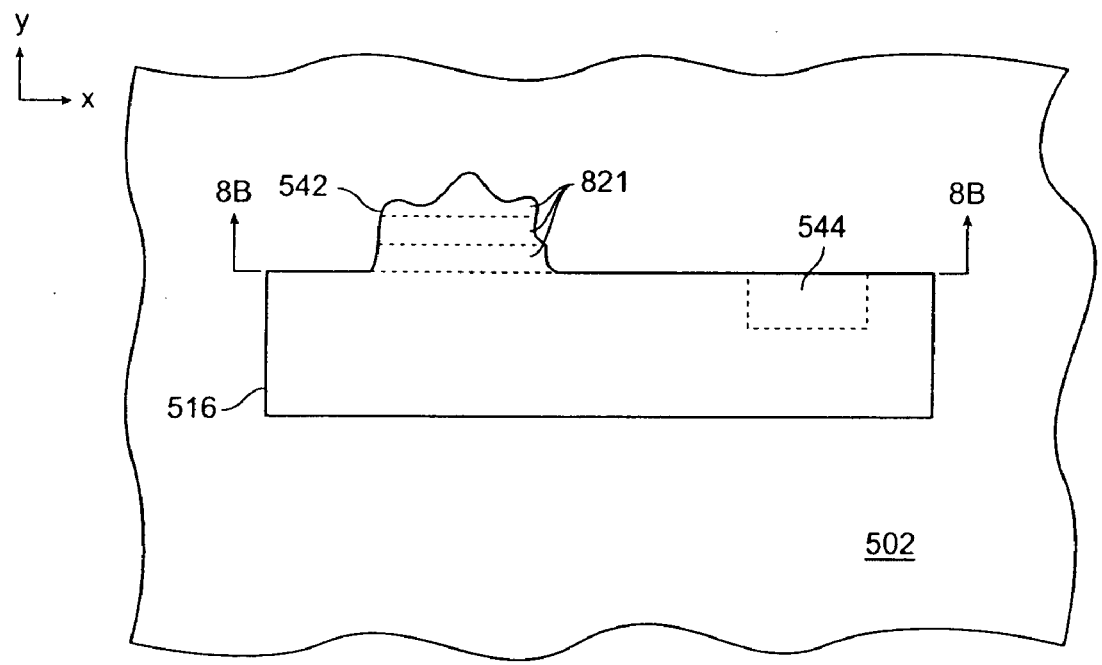
FIGS. 8A and 8B are magnified views from FIG. 5 illustrating a lateral positive surface feature subject to nanomachining.
Figure 8B:
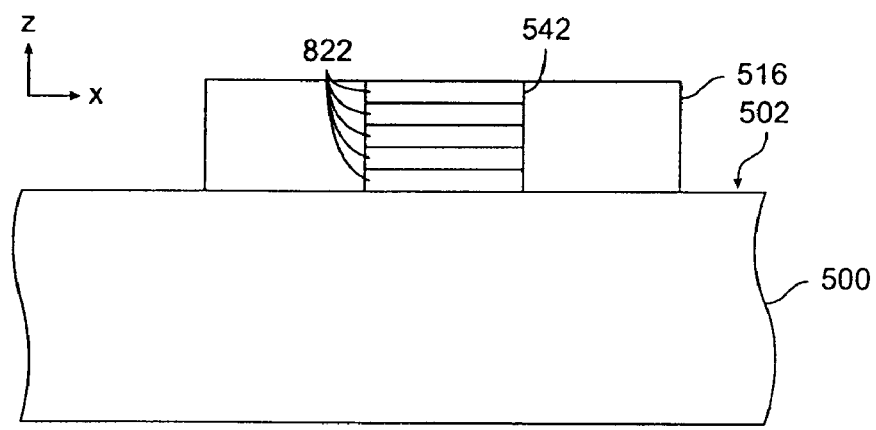

FIGS. 8A and 8B are top and side views, respectively, of the structure 516 with its positive surface feature 542. FIG.

8A is an enlargement of the top view of FIG. 5, showing a series of lateral layers 821. In accordance with an embodiment of the invention, each lateral layer 821 is cut before the next layer is cut. Thus, referring to the cross-sectional side view shown in FIG. 8B, a series of lateral cut passes 822 are performed for a given lateral layer 821. When a lateral layer 821 is complete, the scanning probe is incrementally fed in the Y-direction to cut the next lateral layer. An additional note worth mentioning is that the lateral cut passes 822 can be made in the vertical (Z-direction).

Figure 9A:
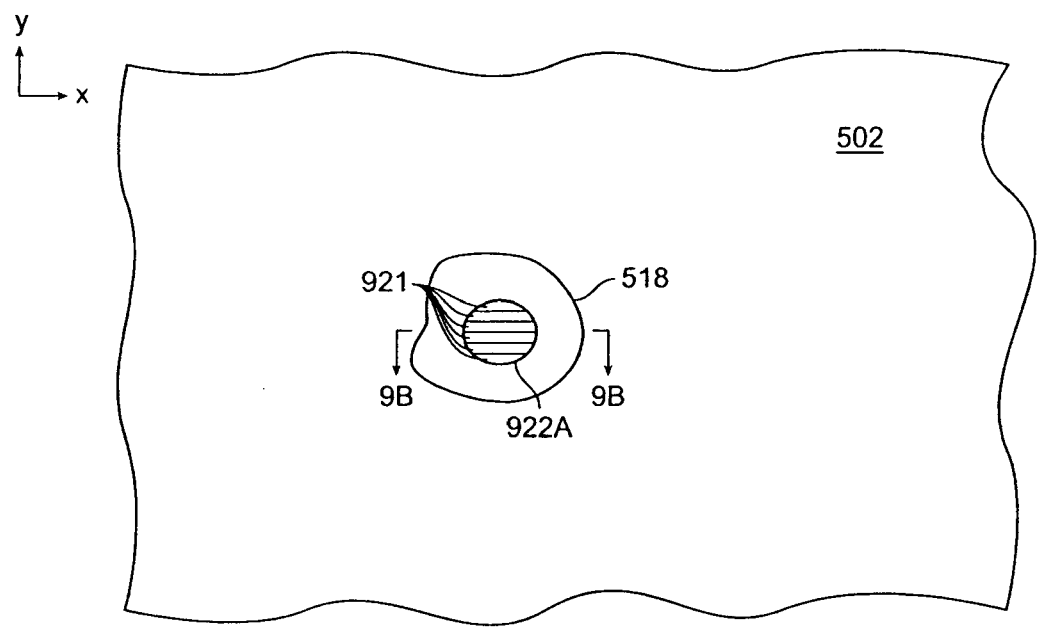
FIGS. 9A and 9B are magnified views from FIG. 5 showing a positive surface feature subject to nanomachining.
Figure 9B:
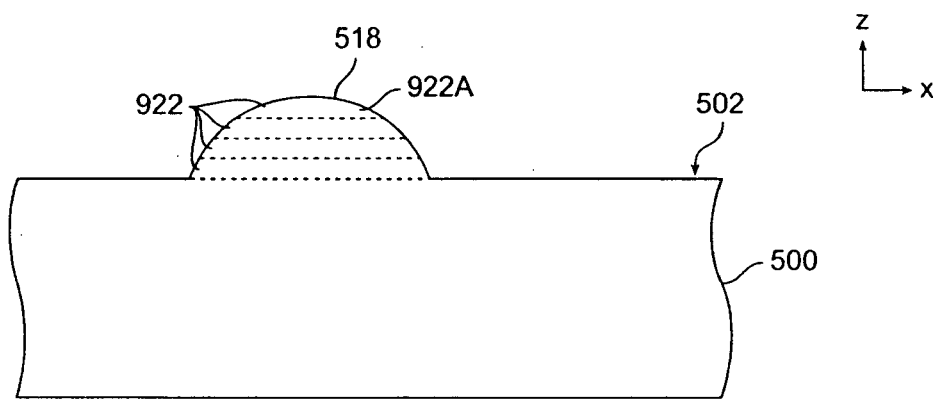

FIGS. 9A and 9B show top and side views, respectively, of a positive surface feature 518 which can be removed using a cutting sequence similar to the technique shown for nanomachining a recess in region 512. Instead of forming a recess, material is removed from a "bump" or other unwanted structure formed on the surface 502. FIG. 9A is an enlargement of the top view of FIG. 5, showing a layer 922A cut by a series of cut passes 921. The layer 922A is the topmost layer of the positive surface feature 518, as can be seen from the cross-sectional side view shown in FIG. 9B. Successive layers 922 are cut, one at a time until a desired portion of the feature 518 is removed.

Figure 10:
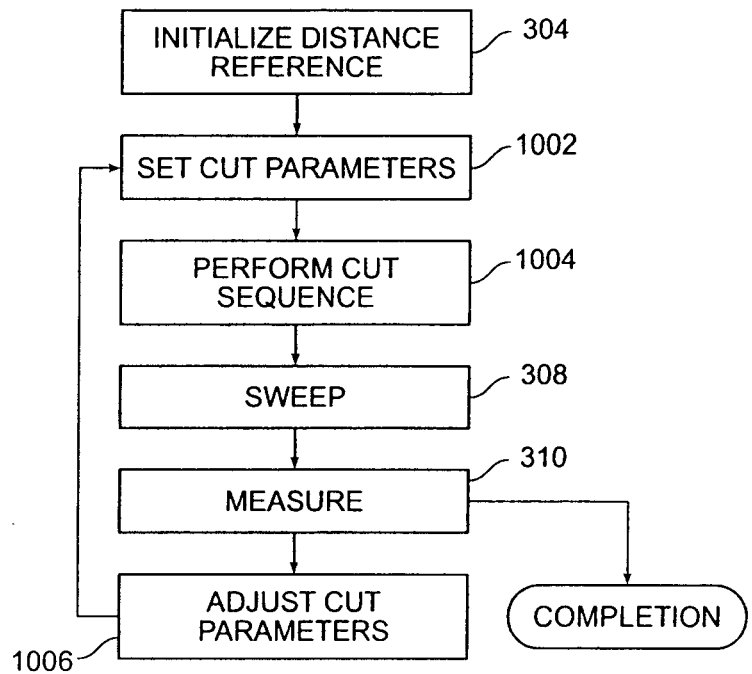
FIG. 10 is a flowchart illustrating a feedback loop for cutting operations in accordance with an embodiment of the invention.

FIG. 10 is a generalized flowchart of cut processing in accordance with an embodiment of the present invention will be discussed. The process of initializing the distance reference in step 304 shown in FIG. 10 has been discussed briefly in connection with FIG. 3. Additional discussion is provided below in connection with the handling of distance measurements.

A set of cutting parameters are obtained to set up the nanomachining system for a cut operation (cutting sequence) in a step 1002. These parameters include settings such as downfeed (or lateral feed for side cuts), speed of cutting, tool angle relative to the surface of the workpiece, direction of cut, and cut overlap. The downfeed (or lateral feed) force can be adjusted by appropriate translations of the translation stage 104. The feed setting affects the amount of material to be removed. Speed of cutting is also varied by proper control of the translation stage.

Figure 11A:
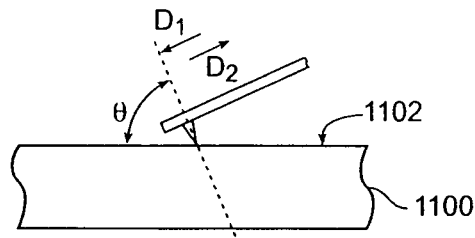
FIGS. 11A and 11B illustrate some cutting parameters.
Figure 11B:
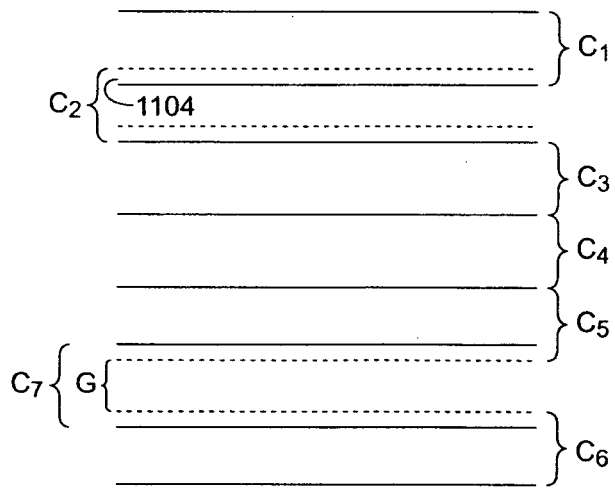

Refer for a moment to FIGS. 11A and 11B. FIG. 11A diagrammatically illustrates that the tip (tool) 232 can be adjusted to an angle θ relative to the surface 1102 of a workpiece 1100. The figure also shows that the direction of travel of the cutting tool (scanning probe) is a settable parameter. A cut in one direction $D_1$ will remove an amount of material different than if the cut was made in different direction $D_2$. FIG. 11B shows that cut overlap can be varied.

FIG. 11B illustrates various cut overlap settings. A typical cut operation will involve a series of cut passes; e.g., FIG. 5 shows a series of cut passes 522 in region 512 and a series of cut passes 534 in region 514. Sequentially made cut passes can be made to overlap or not overlap. Thus, in FIG. 11B, cuts $C_1$ and $C_2$ are cuts made, one following the other, with an overlap indicated by overlap region 1104. Similarly, cuts $C_2$ and $C_3$ overlap. Alternatively, sequentially made cuts can lie adjacent to each other. This situation is shown by cuts $C_3$ and $C_4$, and by cuts $C_4$ and $C_5$. At the other extreme, sequentially made cuts may have gap formed between them. Thus, cuts $C_5$ and $C_6$ are made with a gap region G formed between them. A later cut pass can be made that spans the gap region G. Thus cut $C_7$ is shown overlapping cuts $C_5$ and $C_6$ to remove the material in the gap region G.

Returning to FIG. 10, initially the cutting parameters can be obtained from predefined data sets stored in the data store 152 (FIG. 1). Some of the parameters can be set by the user (a human user, or a machine user) before the cut operations begin. Typical parameters include such factors as the angle, number of vectors (or cutting tip width for downward cuts) and target depth of the cut, the material to be cut, the direction, hold off and number of vectors comprising the sweep.

Next, in a step 1004, a cutting sequence is performed. Depending on the particular circumstances, this step may involve multiple cutting sequences. The cutting sequences include the sequences discussed above in connection with FIGS. 5-9B.

The next step shown in FIG. 10 is a sweep operation in a step 308. This step has been discussed briefly in connection with FIG. 3 and will be described with additional detail below. Briefly, the region is swept clean of debris produced during the cut pass. In an embodiment of the invention where recess cutting is being performed, the debris is swept out of the recess. The surrounding surface area about the recess can also be swept clear of debris.

The step of taking measurement(s) (step 310) will be discussed in more detail in connection with the handling of distance measurements. The purpose of taking the measurements is two-fold: First, the measurements determine the stop point for terminating the nanomachining operation. Second, the measurement can be used to adjust the cutting parameters prior to a subsequent iteration of cutting sequences.

If the measurements made in step 310 indicate the need for another iteration of cutting, then the cutting parameters can be adjusted in a step 1006, in preparation for the next cutting sequence. In accordance with embodiments of the invention, the cutting parameters are adjusted based on various factors such as the current cut parameter settings, measurements of the current cut operation, type of material of the surface being nanomachined, expected typed of material being nanomachined, shape of the tip, constituent material of the tip, and so on. Measurements made of the recently completed cut operation can provide information about the removal rate of the material being nanomachined; for example, by comparing against the previously determined measurements. Information about the material being cut informs the system as to the expected rate of material removal. Information about the structure and material composition of the workpiece informs the system what material it can expect to encounter after nanomachining for a certain distance.

It can be appreciated that these and other factors can be considered in various ways which can then be fed into decision-making processes to adjust the cutting parameters before making the next cutting sequence. For example, circumstances might call for backing off the feed for the next cut, or perhaps increasing the feed force. The number of cut passes may need to be increased or decreased depending on the results of the recently completed cut. The angle of the tool-tip may need to be adjusted. The speed of the cut pass may need to be increased or decreased. It can be seen that FIGS. 12A-12C and 13 show the procedure for making distance measurements in accordance with embodiments of the present invention that are suitable for nanomachining operations. Distance measurements are typically used to gauge the progression of the nanomachining process. Measurements are used to verify the structure being nanomachined and to indicate when the nanomachining process is complete. Typically, there will be two categories of measurements: Z-direction measurements are appropriate for vertical measurements. XY-direction measurements are appropriate for lateral measurements.

Generally, a reference position is selected against which distance measurements about a region to be nanomachined are made. For example, in forming a recess, it is important to be able to measure the depth of the recess as the nanomachining operation progresses, in order to determine when the recess has reached the desired depth. In accordance with embodiments of the invention, a reference position is selected. An initial distance metric is determined, indicative of the distance between the reference position and the region. A set of cut passes is performed on the region, creating a modified region. A check is made by determining an intermediate distance metric and comparing that against the initial distance metric, and based on the outcome of the comparison a decision is made whether to continue or to stop the nanomachining operation.

Figure 12A:
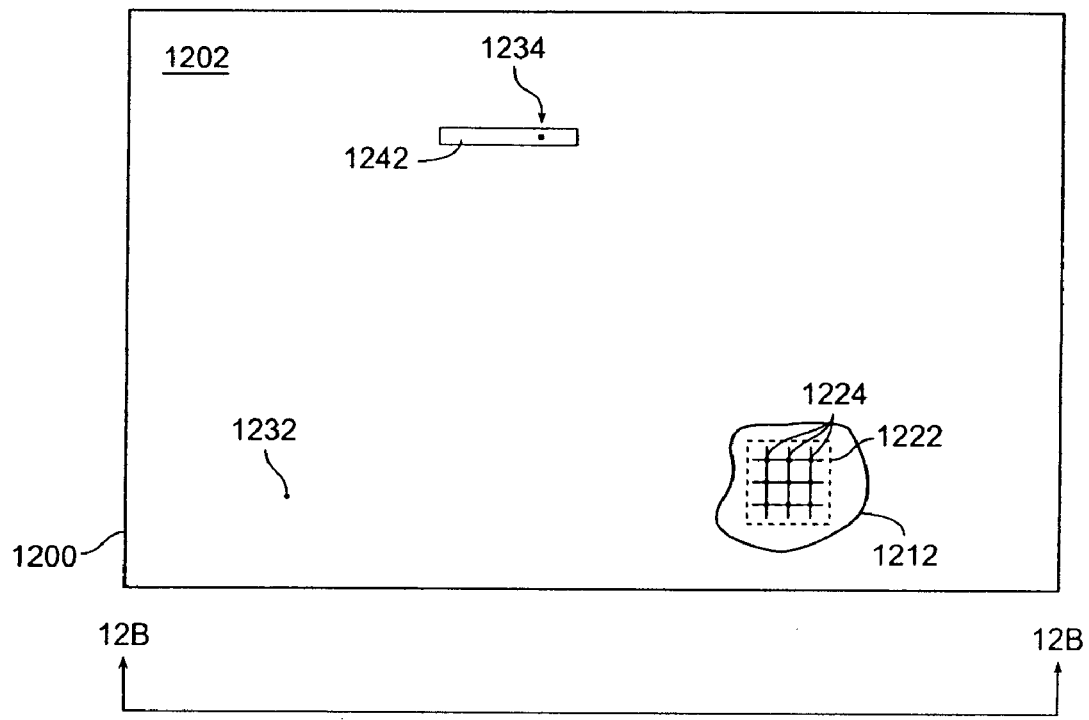
FIGS. 12A-12C illustrate measurement processing in accordance with an embodiment of the invention.
Figure 12B:
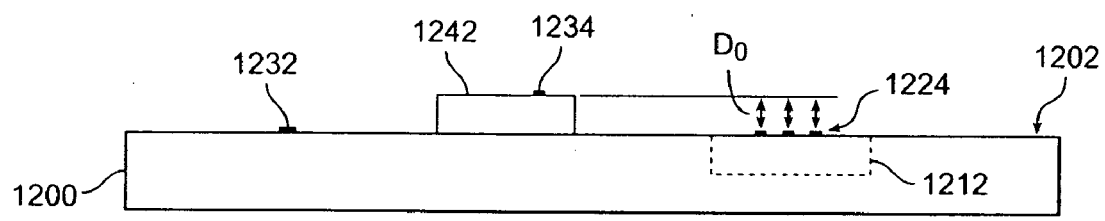
Figure 12C:
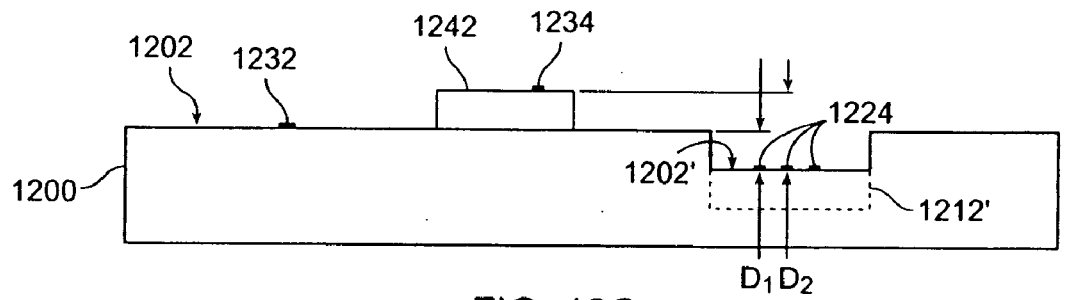
Figure 13:
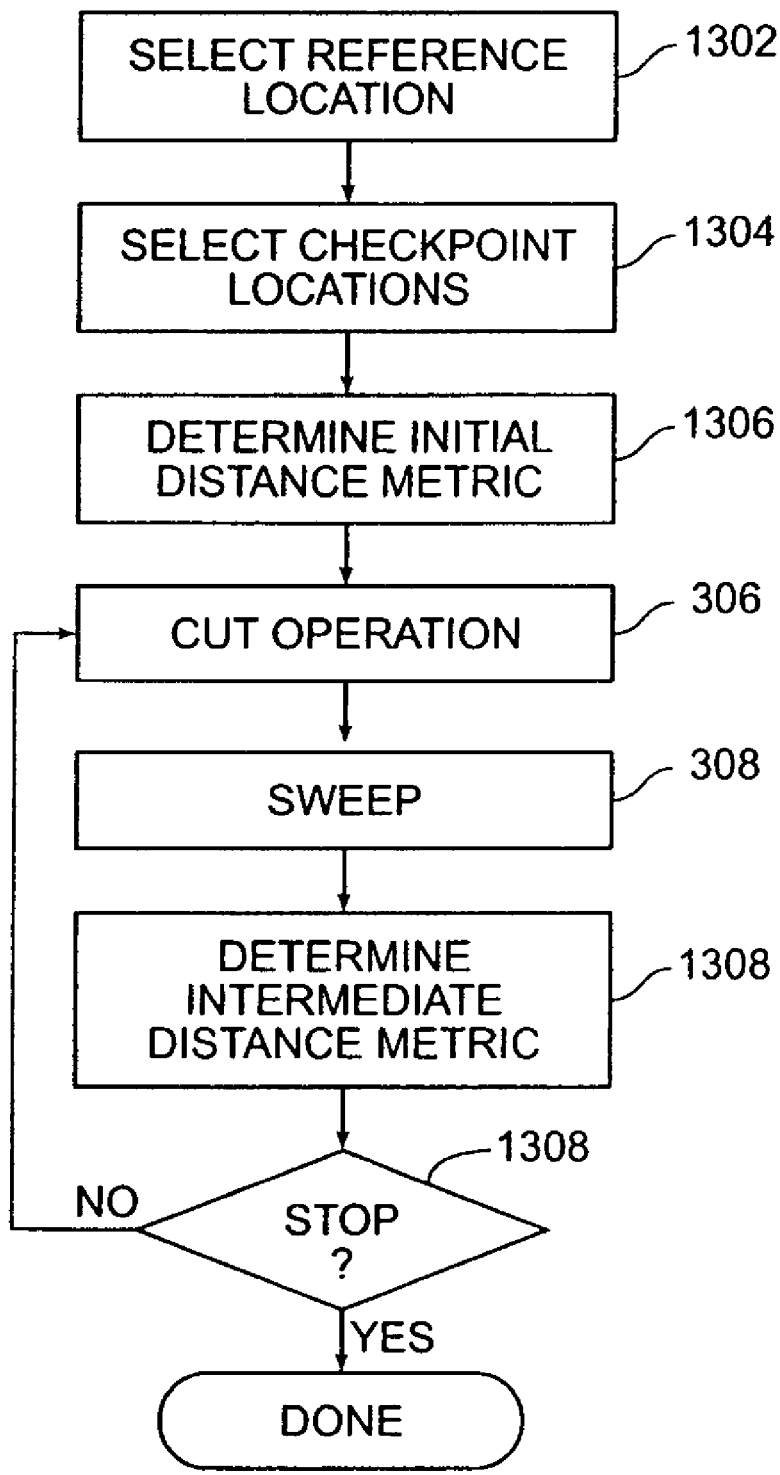
FIG. 13 is a flowchart highlighting the steps for measurement processing in accordance with an embodiment of the invention.

FIGS. 12A-12C are diagrammatic figures showing highly exaggerated features of micron- and submicron-scaled elements to illustrate the processing of Z-direction measurements in accordance with a particular embodiment of the invention. FIG. 12A shows a region 1212 to be nanomachined. In a step 1302, one or more reference positions 1232, 1234 are selected. The reference positions are outside the bounds of the region 1212, located somewhere on the workpiece. As can be seen in FIGS. 12A and 12B, the reference position is not limited to a location directly on the surface 1202 of the workpiece 1200. A reference position can be on a structure 1242, so long as the location is sufficiently far from the region to be nanomachined 1212 as to be free of debris. As will become clear, the presence of debris at a reference position could adversely affect that position for measurement purposes. Consequently, the reference positions are sufficiently spaced apart from the area of the region to be nanomachined so that debris produced during the nanomachining operation will not change the topography of the reference positions. Multiple reference positions can be selected to increase the confidence of the height determination, though in principle only one reference is sufficient.

Next, in a step 1304 one or more checkpoint locations 1224 are selected. The checkpoint locations are used to compute the Z-direction location of the surface of the region being nanomachined. FIG. 12A shows the checkpoints 1224 to be within an area bounded by the region to be nanomachined 1212. In accordance with an embodiment of the invention, an imaginary maximal shape 1222 contained within the region 1212 is superimposed over the region. The checkpoints are determined by imposing a 3×3 grid within the shape 1222 where the cross-points of the grid constitute the checkpoint locations. It is noted that shape 1222, of course, is not limited to a rectilinear shape as shown in the figure. Other geometric shapes might be more appropriate, depending on the object of the nanomachining operation. Also, a grid pattern is not necessary as a basis for selecting the checkpoint locations. The idea is to select one or more checkpoints that would serve as an accurate measurement of the location of the surface during a nanomachining operation. In fact, any method for locating checkpoints within the region to be nanomachined would be consonant with the teachings of the present invention.

In step 1306, an initial distance metric is determined. In accordance with this particular embodiment of the invention, one such metric is determined for each reference position. Thus for each reference position 1232, 1234, the following is performed:

1. A Z-direction distance (e.g., $D_0$) is determined between each checkpoint location 1224 and the reference position (e.g., 1234). The distance is obtained by locating the scanning probe at the reference position (e.g., 1234). This establishes a Z-coordinate reference position for the scanning probe. The scanning probe is then translated to the X-Y coordinate of a first checkpoint 1224 and then lowered until the surface at that X-Y coordinate is detected. The amount of lowering represents the Z-direction distance between the reference position and that checkpoint location. The scanning probe is then restored to the Z-coordinate reference position and translated to the X-Y coordinate of the second checkpoint location. The probe is again lowered until the surface below that X-Y coordinate is detected. This determines the Z-direction distance of the second checkpoint location. The process is repeated for all of the checkpoint locations. The result is a set of nine distance values.
2. The nine distance values are then averaged to arrive at an initial distance metric for the reference position.
3. This is repeated for the other reference positions.

Each distance metric is a composite value representative of the height of the surface of the region to be nanomachined 1212 relative to a reference position (1232, 1234) on the workpiece 1200.

Next, a cut operation (cutting sequence) is performed (step 306) which is followed by a sweep operation (step 308). A cut operation comprises one or more cut passes. The cut operation produces a "modified" region 1212 in that the region now has a new surface that has been exposed by the cut. It may be desirable to measure the distance of the surface in the modified region. In the case of recess formation operation, the distance of interest is the Z-direction distance. The sweep operation (step 308) clears debris from the surface of the new region prior to making the measurement. Sweep processing will be discussed in more detail below.

With reference to FIG. 12C, the cut operation produces a modified region 1212', exposing a new surface 1202'. The height of the newly exposed surface can be measured to ascertain the progress of the nanomachining operation, and as discussed above can be used to inform the feedback loop for changing the cutting parameters for the next pass of cuts.

In step 1310, an intermediate distance metric is determined. In this particular embodiment of the invention, one such metric is determined relative to each of the reference positions (1232, 1234), in a manner as discussed above:

1. A Z-direction distance (e.g., $D_1$, $D_2$) is determined between each checkpoint location 1224 and the reference position (1232, 1234). The distance is obtained by locating the scanning probe at the reference position. This establishes a Z-coordinate reference position for the scanning probe. The scanning probe is then translated to the X-Y coordinate of a checkpoint 1224 and then lowered until the newly exposed surface 1202' of the modified region 1212' at that X-Y coordinate is detected. The amount of lowering represents the Z-direction distance (e.g., $D_1$) between the reference position (e.g., 1232) and the level of the newly exposed surface. The scanning probe is then restored to the Z-coordinate reference position and translated to the X-Y coordinate of the second checkpoint location. The probe is lowered until the surface below that X-Y coordinate is detected, to determine the Z-direction distance of the second checkpoint location. The process is repeated for all of the checkpoint locations. The result is a set of nine distance values.
2. The nine distance values are then averaged to arrive at an intermediate distance metric for the reference position.
3. This is repeated for the other reference positions.

Based on the initial distance metrics and the intermediate distance metrics, a decision (step 1313) can be made whether to continue with a subsequent cutting sequence or not. For example, the difference between the initial and intermediate metrics represents the height of the nanomachined feature (in this case a recess). Thus, a difference between the initial and intermediate metrics for each reference position can be computed. A stop condition can arise if both differences are within a predefined tolerance of a target depth. It can be appreciated that other algorithms for asserting a stop condition might be appropriate. For example, one might simply specify that a certain number of cut passes be performed in the subsequent cutting sequence.

Other information can be gleaned from the individual distance values for each checkpoint location 1224 obtained above in step (1), in addition to taking an average. The individual values can be analyzed to ascertain the flatness of the cut operation, such as the standard deviation, or standard deviation in four directions from the center of the cut, etc. For example, variations in the downfeed might produce a less than satisfactory cut where the distance values along different parts of the region being nanomachined vary beyond an acceptable tolerance. Knowledge of the individual values can be used to set the cut parameters appropriately for the next cutting sequence, perhaps making additional cut passes at some areas of the region but not others. This feedback can be used to produce flat surfaces and, in the general case, surfaces having specific topological features.

It can be appreciated that the foregoing can be readily extended to produce cuts in the X-direction and in the Y-direction. More generally, arbitrary surface features can be produced by the appropriate selection of checkpoint locations and reference positions.

A discussion of so-called "sweep" operations will now be made in connection with the illustrative examples shown in FIGS. 14A-19. Recall in FIG. 3 that a sweep operation (step 308) is performed after each cutting sequence, during a nanomachining procedure. FIGS. 14A-14 and 15A-15D show various patterns of sweep that can be performed. A sweep operation includes positioning the scanning probe at or relative to a starting location. An appropriate downfeed is applied so that the tip is either touching the surface to be swept or spaced apart from the surface by a small distance. The probe is then translated in a direction away from the start position, along a scan vector. Any material lying in the path of the scan vector is "swept" along by the tip.

Figure 14A:
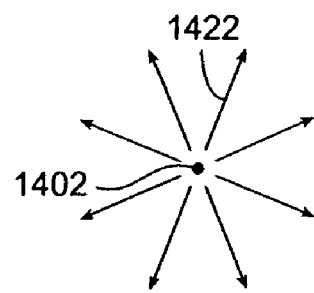
FIGS. 14A-14C illustrate sweep patterns in accordance with an embodiment of the invention.
Figure 14B:
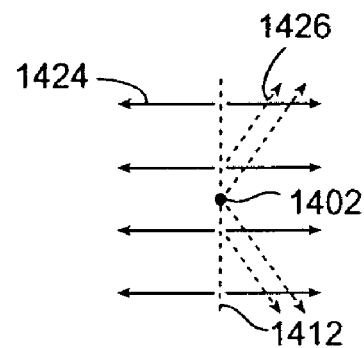
Figure 14C:
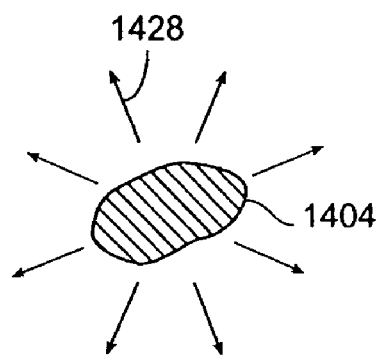

FIGS. 14A-14C illustrate some patterns. In FIG. 14A, a start position 1402 for the sweep is identified. In this case, the start position is identified by an X-Y coordinate pair. A scanning probe (not shown) is positioned at the start position, adjusted with an appropriate downfeed, and translated along a scan vector 1422. The probe is then returned to the start position 1402, and translated along a second scan vector. Since the probe is returned to the same X-Y starting coordinates, the resulting sweep pattern is a radial pattern as shown in FIG. 14A.

FIG. 14B shows a variation of the radial sweep pattern. Rather than returning the scanning probe to X-Y starting coordinate 1402, the probe is probe is positioned to a location relative to starting coordinate, more particularly, along a scan start line 1412 passing through the start position. Scan vectors 1424 can be made in a direction that is orthogonal to the scan start line. Alternatively, radially-directed scan vectors 1426 can be made, each vector departing from the scan start line at angles other than 90° relative to the line.

FIG. 14C shows another variation of the radial sweep pattern. Here, the starting "position" comprises a set of locations about the periphery of a region 1404 being nanomachined. The scanning probe is positioned at a first location about the periphery of the region 1404 and subsequently translated along a scan vector 1428 directed away from the region.

Figure 15A:
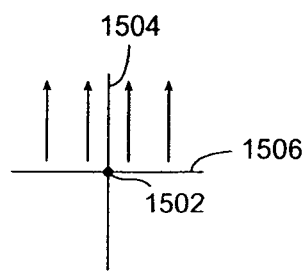
FIGS. 15A-15D show a sweep sequence.

FIGS. 15A-15D illustrate a sweep sequence according to an embodiment of the present invention. Generally, the sweep pattern is performed relative to an origin location 1502. In FIG. 15A, a first series of sweep scans (indicated by the solid arrows) is performed. The start position for each scan lies along a scan start line 1506 passing through the location 1502. A scanning probe (not shown) is positioned at a first position along the scan start line. The sweep scan is performed along a scan vector that is perpendicular to the line 1506. This is repeated for the first series of sweeps.

Figure 15B:
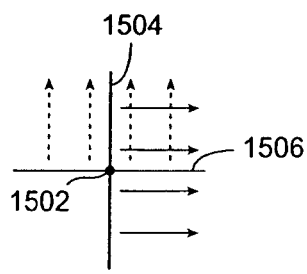
Figure 15C:
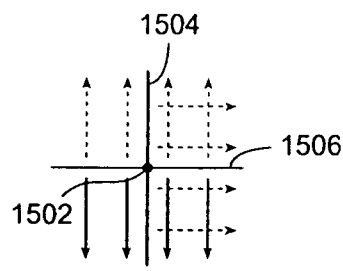
Figure 15D:
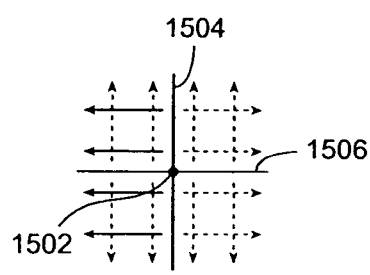

Next, in FIG. 15B, a second series of sweep scans is shown. The start positions lie along a scan start line 1504 passing through the location 1502. The scanning probe is translated along vectors perpendicular to the line 1504 shown by the solid arrows. FIGS. 15C and 15D show third and fourth scans respectively, performed in similar fashion. It can be appreciated that the vector directions need not be perpendicular. In the most general case, the vectors can be in any direction. However, "sweeping" of debris is going to be effective with some patterns more than others.

Figure 16:
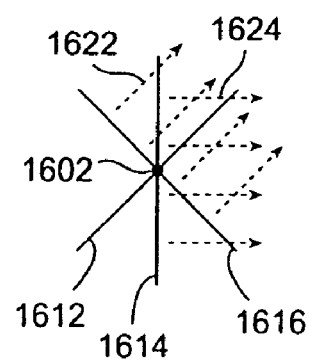
FIG. 16 shows a generalized sweep pattern.

FIG. 16 shows a generalization of the sweep pattern shown in FIGS. 15A-15D. Here, the sweep start positions lie along scan start lines 1612, 1614, and 1616 which pass through an origin location 1602. As can be seen, any number of scan start lines can used. Moreover, there is no requirement that the lines be orthogonal; each line can be rotated by any angle relative to another line. The specific number of start scan lines and their rotations will be dependent on factors specific to the particular nanomachining operation.

Figure 17:
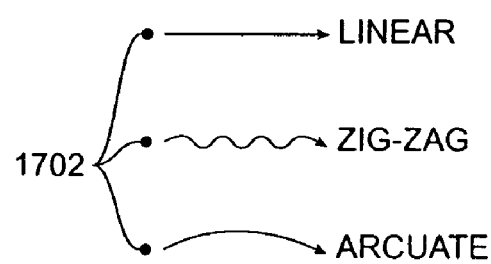
FIG. 17 shows various sweep vectors.

FIG. 17 shows various scan vectors that can be used with the sweep operation. First, is a linear vector which proceeds from a start position 1702 along a straight-line path. Second, is a zig-zag vector having a sawtooth-style pattern. A third vector is a curvilinear (arcuate) path. From these example vector shapes, it can be appreciated that vectors other than straight line vectors are possible and perhaps preferable given the right circumstances.

Figure 18:
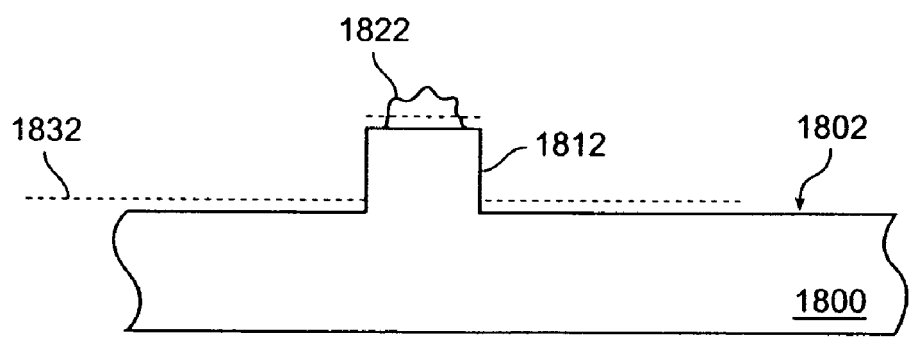
FIG. 18 is a gross scale illustration of a sweep-cut operation in accordance with an embodiment of the invention.
Figure 19:
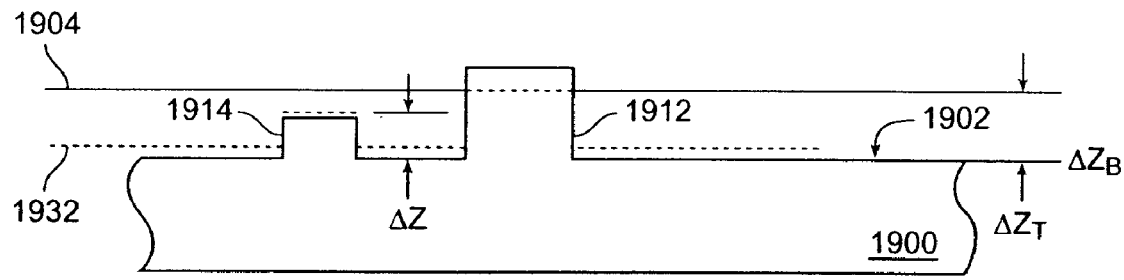
FIG. 19 is a gross scale illustration of a sweep-cut operation in accordance with another embodiment of the invention.
Figure 20:
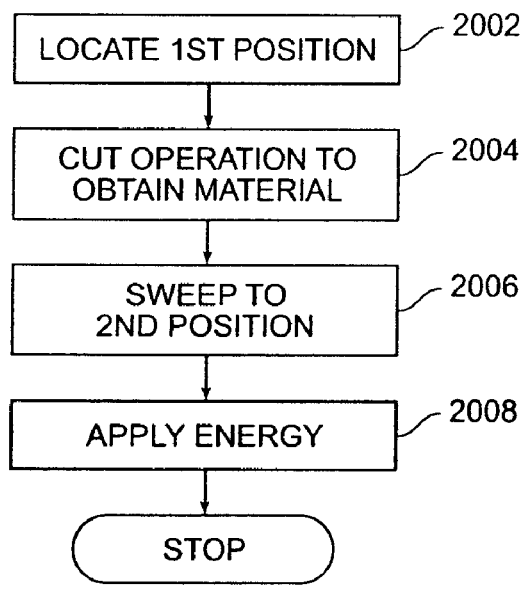
FIG. 20 is a generalized flow chart for sweep-cut processing.

It was mentioned above that sweep processing is just another form of cut operation, albeit a somewhat specialized form of cut operation. Referring now to FIGS. 18 through 20, additional kinds of sweep-cut operations will now be described.

The sweep-cut operation shown in FIG. 18 involves an initial data collection step. An initial scan is made to collect information about the topology of the surface. The topological information can include the X-Y coordinates of the translation vectors that direct the scan, and information indicative of the location of the various surface structures found during the scan of the surface of the workpiece, typically X-Y coordinates, and corresponding Z (height/depth) values. After the data collection has been performed, the workpiece can then be subjected to various processing steps. For example, some nanomachining operations may be performed, or other processing. This subsequent processing may produce surface artifacts which alter the topology of the workpiece. The artifacts might be undesirable and if so should be removed.

A subsequent sweep-scan is then performed. The scanning probe is translated across the surface of the workpiece in the X-Y direction according to the original translation vectors and in the Z-direction. The X-Y translations and the Z translations of the scanning probe are compared with the corresponding information contained in the previously collected information. When an unexpected positive feature, e.g., a protuberance from a surface, a lump, a bump, etc., is encountered, the scanning probe can be operated to perform a cut operation to remove the unexpected feature.

FIG. 18 illustrates this scenario. During the data collection step, topological information about the surface 1802 of a workpiece 1800 is collected. The data contains information indicative of the presence of surface feature 1812. Next, suppose some process is performed on the workpiece which results in an artifact that manifests itself as surface feature 1822. A subsequent pass is performed wherein the tip is translated along a set of vectors that correspond to the original surface, plus or minus a certain offset amount in the Z direction (which may be 0). During this pass, any debris or other element not originally on the surface will be removed. This operation is not a scan operation in the conventional sense where data is collected, since there is no data collection taking place. In order to distinguish the foregoing operation from a conventional data collecting scan, the phrases "sweep-scan" and "sweep-cut" have been adopted.

Another sweep-cut operation, illustrated in FIG. 19, does not rely on data collected by an initial surface scan. Here, the surface scan is performed at the same time one or more cutting operations are performed. A cut operation is made when the Z translation exceeds a predetermined threshold value. Thus for structures above this predetermined value, the tip begins nanomachining and scanning (servoing up or down is turned off for a short distance, which is a parameter to be set for this modality).

FIG. 19 illustrates this so-called "threshold" sweep-cut process. The process begins by establishing a baseline Z (height), $Z_B$. Typically this is the Z-value at a surface 1902 of the workpiece 1900. Next, a scan is initiated along a scan path 1932. As the scanning probe (not shown) is translated in the Z-direction by the servo system as it detects various elements on the surface, its change in the Z direction ($\Delta Z$) is determined and compared against a threshold value $\Delta Z_T$. If the threshold value is not exceeded then the scanning progresses. This is the case with the feature 1914, where the $\Delta Z$ of the feature is less than the threshold value. When a feature is encountered which drives the scanning probe to a $\Delta Z$ that exceeds $\Delta Z_T$, then that feature is cut. FIG. 19 shows this with feature 1912. Scanning continues in this manner until completion.

FIG. 20 is a high level flowchart outlining the general sequence of cut and sweep operations for manipulating surface features at the micron and sub-micron level according to an embodiment of the present invention. First, a location is selected in step 2002 from which an amount of material is to be obtained. The scanning probe is translated to the location. In step 2004, an appropriate cut operation is selected to "scrape off" an amount of material from the surface or from a structure. This creates a pile of material in the area of the first location. Next, in step 2006, the material is swept to a second location by any of the aforementioned sweep techniques. An amount of energy, say heat, is then applied (step 2008). This can initiate a physical change to the amount of material just moved, causing it to coalesce with the material in the area of the second location.

In an alternative embodiment of the invention, a workpiece can be inspected to identify areas of defects. A suitable subsequent processing operation can be employed to deposit or otherwise form "lumps" of appropriate material proximate the areas of defects. These lumps of material act as sources of material for repairing certain types of defects. By applying the sequence outlined in FIG. 20, the deposited material can be scraped off and pushed around to the defect areas for repair.

In one example, a laser Mask repair device is used to deposit an area of chrome on a chrome mask missing some features. It can happen that the deposit is larger and less precise than the desired feature. Processing in accordance with embodiments of the present invention can be used to cut and trim the feature to size. In another example, suppose chrome debris is produced by partially nanomachining an area adjacent to the target area needing material added. The debris from the machining can then be swept up into the area needing material to a desired height and depth. Trim and cutting may then be performed to refine the swept up shape and the whole object baked at an elevated temperature either by exposure in the nanomachining tool or in a separate heating arrangement such as an external positionable laser spot source, or a conventional furnace. This thermal processing integrates the chrome (or other materials like quartz, silicon, an oxide of silicon (e.g., $SiO$, $SiO_2$), silicon nitride, carbon, and so on) debris into the target structure.

What is claimed is:

1. In a nanomachining system having an SPM scanning probe and a translation apparatus coupled to provide translational motion of the SPM scanning probe, a method for moving material in a region of a workpiece, the method comprising:

performing one or more cut operations on a region of a workpiece, the one or more cut operations producing a deposit of debris in the region of the workpiece; and removing the deposit of debris entirely from the region of the workpiece to another location including performing steps of:

(a) positioning the SPM scanning probe at a sweep-start position in the region of the workpiece, the sweep-start position lying on a first reference line;

(b) adjusting the SPM scanning probe along the Z-direction to a first Z-direction position;

(c) moving a first portion of the deposit of debris in a direction substantially orthogonal to the first reference line by translating the SPM scanning probe in a direction substantially orthogonal to the first reference line on which the sweep-start position lies; and (d) moving additional portions of the deposit of debris by repeating steps (a)-(c) using additional sweep-start positions along the first reference line and by adjusting the Z-direction position of the SPM scanning probe.

2. The method of claim 1 wherein the region is a region being nanomachined.

3. The method of claim 1 wherein, in step (c), the scanning probe moves away from the sweep-start position along a substantially straight line of motion.

4. The method of claim 1 wherein, in step (c), the scanning probe moves away from the sweep-start position along a line of motion having a zig-zag pattern.

5. The method of claim 1 further comprising:

(e) moving still further additional portions of the deposit of debris in a direction substantially orthogonal to a second reference line by positioning the SPM scanning probe at a sweep-start position lying on the second reference line and performing steps (a)-(d) for the second reference line.

6. A nanomachining system comprising:

an SPM scanning probe;

a translation apparatus coupled to the SPM scanning probe to provide translational motion of the SPM scanning probe;

a controller coupled to operate the translation apparatus, the controller configured to:

perform one or more cut operations on a region of a workpiece, the one or more cut operations producing a deposit of debris in the region of the workpiece; and remove the deposit of debris entirely from the region of the workpiece to another location including performing steps of:

(a) positioning the SPM scanning probe at a sweep-start position in a region of the workpiece, the sweep-start position lying on a first reference line, the first reference line being one among a plurality of reference lines passing through a common point of origin in the region;

(b) adjusting the SPM scanning probe along the Z-direction to a first Z-direction position;

(c) moving a first portion of the deposit of debris in a direction substantially orthogonal to the first reference line by translating the SPM scanning probe in a direction substantially orthogonal to the first reference line on which the sweep-start position lies; and (d) moving additional portions of the deposit of debris by repeating (a)-(c) using additional sweep-start positions along the first reference line and by adjusting the Z-direction position of the SPM scanning probe.

7. The nanomachining system of claim 6 wherein the controller is further configure to move still further additional portions of the deposit of debris in a direction substantially orthogonal to a second reference line by positioning the SPM scanning probe at a sweep-start position lying on the second reference line and performing (a)-(d) for the second reference line.

8. A computer-program product embodied on a tangible computer-readable storage medium comprising program code configured to cause a computerized controller to operate an SPM scanning probe, the computer program code comprising:

first computer instructions which, when executed by the computerized controller, cause the computerized controller to:

perform one or more cut operations on are ion of a workpiece, the one or more cut operations producing a deposit of debris in the region of the workpiece; and remove the deposit of debris entirely from the region of the workpiece to another location including performing steps of:

(a) positioning the SPM scanning probe at a sweep-start position in a region of the workpiece, the sweep-start position lying on a first reference line, the first reference line being one among a plurality of reference lines passing through a common point of origin in the region;

(b) adjusting the SPM scanning probe along the Z-direction to a first Z-direction position;

(c) moving a first portion of the deposit of debris in a direction substantially orthogonal to the first reference line by translating the SPM scanning probe in a direction substantially orthogonal to the first reference line on which the sweep-start position lies; and (d) moving additional portions of the deposit of debris by repeating (a)-(c) using additional sweep-start positions along the first reference line and by adjusting the Z-direction position of the SPM scanning probe.

9. The computer-program product of claim 8 wherein the second first computer instructions which, when executed by the computerized controller, further cause the computerized controller to move still further additional portions of the deposit of debris in a direction substantially orthogonal to a second reference line by positioning the SPM scanning probe at a sweep-start position lying on the second reference line and performing (a)-(d) for the second reference line.

\* \* \* \* \*